US012633116B2

(12) United States Patent
Saha et al.

(10) Patent No.: US 12,633,116 B2
(45) Date of Patent: May 19, 2026

(54) SYSTEMS AND METHODS FOR PERFORMING AN AUTONOMOUS AIRCRAFT VISUAL INSPECTION TASK

(71) Applicant: Tata Consultancy Services Limited, Mumbai (IN)

(72) Inventors: Arindam Saha, Kolkata (IN); Mohan Bhaskara, Bangalore (IN); Ranjan Dasgupta, Kolkata (IN); Lokesh Kumar, Kolkata (IN); Sarvesh Sortee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 143 days.

(21) Appl. No.: 18/421,333

(22) Filed: Jan. 24, 2024

(65) Prior Publication Data

US 2024/0371155 A1 Nov. 7, 2024

(30) Foreign Application Priority Data

Feb. 8, 2023 (IN) .............................. 202321008197

(51) Int. Cl.
G06V 20/17 (2022.01)
B64U 20/87 (2023.01)
(Continued)

(52) U.S. Cl.
CPC ............. G06V 20/17 (2022.01); B64U 20/87 (2023.01); G06T 17/10 (2013.01);
(Continued)

(58) Field of Classification Search
CPC .... G06V 20/17; B64U 20/87; B64U 2101/26; B64U 2201/10; G06T 17/10;
(Continued)

(56) References Cited

U.S. PATENT DOCUMENTS

2018/0336780 A1* 11/2018 Ran ...................... G08G 1/0145
2019/0325638 A1* 10/2019 Lucas ....................... G06T 7/55
(Continued)

OTHER PUBLICATIONS

Bugaj et al., "Unmanned Aerial Vehicles and Their Use for Aircraft Inspection," (2020).

(Continued)

*Primary Examiner* — Anne Marie Antonucci
*Assistant Examiner* — Luis G Del Valle
(74) *Attorney, Agent, or Firm* — FINNEGAN, HENDERSON, FARABOW, GARRETT & DUNNER, LLP

(57) ABSTRACT

This disclosure provides system and method for performing an autonomous aircraft visual inspection task using an unmanned aerial vehicle (UAV). The UAV is equipped with a front-facing RGB-D camera, one Velodyne three dimensional Light Detection and Ranging with 64 channels, and one Inertial Measurement Unit. In the method of the present disclosure, the UAV takeoff from any nearby location of the aircraft and face the RGB-D camera towards the aircraft. The UAV find the nearest landmark using a template matching approach and register with the aircraft coordinate system. The UAV navigate using LiDAR and IMU measurements, whereas the inspection process uses measurements from the RGB-D camera. The UAV navigate using a proposed safe navigation around the aircraft by avoiding obstacles. The system identifies the objects of interest using a deep-learning based object detection tool and then performs the inspection. A simple measuring algorithm for simulated objects of interest is implemented.

15 Claims, 15 Drawing Sheets

(51) Int. Cl.
    *B64U 101/26*        (2023.01)
    *G06T 17/10*        (2006.01)

(52) U.S. Cl.
    CPC ...... *B64U 2101/26* (2023.01); *B64U 2201/10*
    (2023.01); *G06T 2207/10024* (2013.01); *G06T*
    *2207/10028* (2013.01); *G06T 2207/30252*
    (2013.01)

(58) Field of Classification Search
    CPC . G06T 2207/10024; G06T 2207/10028; G06T
    2207/30252; G06T 7/74; G06T
    2207/20081; G06T 2207/20084; G06T
    2207/30156; G06T 2207/30244; G06T
    7/0004; G05D 2107/70; G05D 2111/10;
    G05D 2111/64; G05D 1/2465; G05D
    1/689; G05D 2105/89; G05D 2109/254
    See application file for complete search history.

(56) References Cited

U.S. PATENT DOCUMENTS

| | | | |
|---|---|---|---|
| 2021/0012520 A1* | 1/2021 | Zhou | ............... G05D 1/0038 |
| 2023/0073587 A1* | 3/2023 | Scott | ............... G06T 7/001 |

OTHER PUBLICATIONS

Cazzato et al., "Vision-Based Aircraft Pose Estimation for UAVs Autonomous Inspection without Fiducial Markers," (2019).
Jothi et al., "Aircraft Visual Damage Inspection with Autonomous Drone and Image Processing," International Journal of Research in Engineering, Science and Management, 4(4) (2021).
Malandrakis et al., "Inspection of Aircraft Wing Panels Using Unmanned Aerial Vehicles," Proceedings of the 5th IEEE International Workshop on Metrology for AeroSpace (2018).
Papa et al., "Preliminary Design of an Unmanned Aircraft System for Aircraft General Visual Inspection," Electronics, 7 (2018).
Silberberg, "Aircraft Inspection by Multirotor UAV Using Coverage Path Planning," Thesis, Air Force Institute of Technology (2021).

\* cited by examiner

Obtaining, a template of three-dimensional (3D) representation of geometry of an aircraft in a first coordinate frame for a visual inspection task to be conducted by an unmanned aerial vehicle (UAV) — 202

Dividing the template of the three-dimensional (3D) representation of the geometry of the aircraft into a plurality of landmark regions to obtain a plurality of templates corresponding to each of plurality of landmark regions, wherein the plurality of templates are obtained in the first coordinate frame — 204

Registering the template of the three-dimensional (3D) representation of the geometry of the aircraft in the first coordinate frame with a target point cloud which is captured by the UAV in a second coordinate frame using a template matching approach, wherein the template matching approach comprises: computing a first transformation between a plurality of template point clouds and a target point cloud, computing, a matching score between each transformed template point cloud from a plurality of template point clouds and the target point cloud, wherein the matching score is a measure of an average Euclidean distance of a plurality of three-dimensional (3D) points between the plurality of transformed template point clouds and the target point cloud; determining an optimal transformed template point cloud from the transformed plurality of template point clouds having an optimal match with the target point cloud based on the computed matching score, wherein the optimal match is determined when the computed matching score between the optimal transformed template point cloud and the target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation — 206

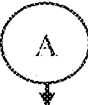

Sequentially navigating the UAV from a current location to a desired target location of each of the plurality of landmark regions using the plurality of the first target poses of the UAV determined for each of the plurality of landmark regions                                                                    208 identifying one or more objects of interest in each of the plurality of landmark regions using a deep learning based object detection approach during sequential navigation, wherein the one or more objects of interest are identified based on one or more characteristics                                           210 computing a set of second target poses of the UAV in second coordinate frame for the identified one or more objects of interest in each of the plurality of landmark regions                                                                           212 autonomously performing, the visual inspection task after attaining the computed set of second target poses on the identified one or more objects of interest in each of the plurality of landmark regions, wherein the visual inspection task is performed as a function of area measurement and maximum distance measurement of the identified one or more objects of interest                                                                        214

200              FIG. 4B

SYSTEMS AND METHODS FOR PERFORMING AN AUTONOMOUS AIRCRAFT VISUAL INSPECTION TASK

PRIORITY CLAIM

This U.S. patent application claims priority under 35 U.S.C. § 119 to: India application No. 202321008197, filed on Feb. 8, 2023. The entire contents of the aforementioned application are incorporated herein by reference.

TECHNICAL FIELD

The disclosure herein generally relates to the field of visual inspection, and, more particularly, to systems and methods for performing an autonomous aircraft visual inspection task.

BACKGROUND

With maturity in autonomous navigation of Unmanned Aerial Vehicle (UAV), there is a possibility to deploy UAV for different kinds of inspection jobs. Aircraft inspection is a well-known periodic process in aviation history, which is long, costly, and subjective. Manual aircraft inspection usually takes long times, where multiple sensors on the aircraft's outer surface, dents, lightning strikes, paint, an/or the like are mainly checked. An advantage of a UAV-based inspection is to minimize turnaround time, which reduces cognition effort of pilot before take-off, provides unambiguous defect detection, early indication of longer maintenance tasks (like icing on the wings, tyre replacement). Also, the UAV-based inspection provides photographic and video graphic evidences for defects and in any unfortunate case, for crash investigation. There exist multiple challenges with the UAV-based inspection including safety of the multi-million dollar aircraft while a UAV navigate, accurate identification of defects in the millimeter range, accurate localization of the defect on the aircraft body surface, and/or the like. Thus, an inspection approach which is independent of the aircraft model and scalable for any model with minimal effort is required.

Conventional approaches involves UAV that are either manually controlled by a pilot or where route for the inspection is predefined. This limits the effectiveness and speed of the UAV. At the same time, it can be difficult for a pilot to maneuver the UAV around certain parts of the aircraft that limit mobility, such as under the fuselage and on top or under the main and tail wings. This infact increases the pilot cognition load than the current exterior walk-around.

SUMMARY

Embodiments of the present disclosure present technological improvements as solutions to one or more of the above-mentioned technical problems recognized by the inventors in conventional systems. For example, in one embodiment, a processor implemented method is provided. The processor implemented method, comprising obtaining, via an I/O interface, a template of three-dimensional (3D) representation of a geometry of an aircraft in a first coordinate frame for a visual inspection task to be conducted by an unmanned aerial vehicle (UAV); dividing, via the one or more hardware processors, the template of the three-dimensional (3D) representation of the geometry of the aircraft into a plurality of landmark regions to obtain a plurality of templates corresponding to each of the plurality of landmark regions, wherein the plurality of templates are obtained in the first coordinate frame; registering, via the one or more hardware processors, the plurality of templates of the three-dimensional (3D) representation of the geometry of the aircraft in the first coordinate frame with a target point cloud which is captured by the UAV in a second coordinate frame using a template matching approach, wherein the template matching approach comprises: computing a first transformation between a plurality of template point clouds and the target point cloud; computing, a matching score between each transformed template point cloud from a plurality of transformed template point clouds and the target point cloud, wherein the matching score is a measure of an average Euclidean distance of a plurality of three-dimensional (3D) points between the plurality of transformed template point clouds and the target point cloud; determining an optimal transformed template point cloud from the plurality of transformed template point clouds having an optimal match with the target point cloud based on the computed matching score, wherein the optimal match is determined when the computed matching score between the optimal transformed template point cloud and the target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation; sequentially navigating, via the one or more hardware processors, the UAV from a current location to a desired target location of each of the plurality of landmark regions using the plurality of first target poses of the UAV determined for each of the plurality of landmark regions; identifying, via the one or more hardware processors, one or more objects of interest in each of the plurality of landmark regions using a deep learning based object detection approach during sequential navigation, wherein the one or more objects of interest are identified based on one or more characteristics; computing, via the one or more hardware processors, a set of second target poses of the UAV in second coordinate frame for the identified one or more objects of interest in each of the plurality of landmark regions; and autonomously performing, via the one or more hardware processors, the visual inspection task after attaining the computed set of second target poses on the identified one or more objects of interest in each of the plurality of landmark regions, wherein the visual inspection task is performed as a function of area measurement and maximum distance measurement of the identified one or more objects of interest.

In another aspect, a system is provided. The system comprising a memory storing instructions; one or more communication interfaces; and one or more hardware processors coupled to the memory via the one or more communication interfaces, wherein the one or more hardware processors are configured by the instructions to obtain, a template of three-dimensional (3D) representation of a geometry of an aircraft in a first coordinate frame for a visual inspection task to be conducted by an unmanned aerial vehicle (UAV); divide, the template of the three-dimensional (3D) representation of the geometry of the aircraft into a plurality of landmark regions to obtain a plurality of templates corresponding to each of the plurality of landmark regions, wherein the plurality of templates are obtained in the first coordinate frame; register, the plurality of templates of the three-dimensional (3D) representation of the geometry of the aircraft in the first coordinate frame with a target point cloud which is captured by the UAV in a second coordinate frame using a template matching approach, wherein the template matching approach comprises: computing a first transformation between a plurality of template point clouds and a target point cloud; computing, a matching score between each transformed template point cloud from a plurality of transformed template point clouds and the target point cloud, wherein the matching score is a measure of an average Euclidean distance of a plurality of three-dimensional (3D) points between the plurality of transformed template point clouds and the target point cloud; determining an optimal transformed template point cloud from the plurality of transformed template point clouds having an optimal match with the target point cloud based on the computed matching score, wherein the optimal match is determined when the computed matching score between the optimal transformed template point cloud and the target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation; sequentially navigate, the UAV from a current location to a desired target location of each of the plurality of landmark regions using the plurality of first target poses of the UAV determined for each of the plurality of landmark regions; identify, one or more objects of interest in each of the plurality of landmark regions using a deep learning based object detection approach during sequential navigation, wherein the one or more objects of interest are identified based on one or more characteristics; compute, a set of second target poses of the UAV in second coordinate frame for the identified one or more objects of interest in each of the plurality of landmark regions; and autonomously perform, the visual inspection task after attaining the computed set of second target poses on the identified one or more objects of interest in each of the plurality of landmark regions, wherein the visual inspection task is performed as a function of area measurement and maximum distance measurement of the identified one or more objects of interest.

In yet another aspect, a non-transitory computer readable medium is provided. The non-transitory computer readable medium are configured by instructions for obtaining, a template of three-dimensional (3D) representation of a geometry of an aircraft in a first coordinate frame for a visual inspection task to be conducted by an unmanned aerial vehicle (UAV); dividing, the template of the three-dimensional (3D) representation of the geometry of the aircraft into a plurality of landmark regions to obtain a plurality of templates corresponding to each of the plurality of landmark regions, wherein the plurality of templates are obtained in the first coordinate frame; registering, the template of the three-dimensional (3D) representation of the geometry of the aircraft in the first coordinate frame with a target point cloud which is captured by the UAV in a second coordinate frame using a template matching approach, wherein the template matching approach comprises: computing a first transformation between a plurality of template point clouds and a target point cloud; computing, a matching score between each transformed template point cloud from a plurality of transformed template point clouds and the target point cloud, wherein the matching score is a measure of an average Euclidean distance of a plurality of three-dimensional (3D) points between the plurality of transformed template point clouds and the target point cloud; and determining an optimal transformed template point cloud from the transformed plurality of template point clouds having an optimal match with the target point cloud based on the computed matching score, wherein the optimal match is determined when the computed matching score between the optimal transformed template point cloud and the target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation; sequentially navigating, the UAV from a current location to a desired target location of each of the plurality of landmark regions using the plurality of first target poses of the UAV determined for each of the plurality of landmark regions; identifying, one or more objects of interest in each of the plurality of landmark regions using a deep learning based object detection approach during sequential navigation, wherein the one or more objects of interest are identified based on one or more characteristics; computing, a set of second target poses of the UAV in second coordinate frame for the identified one or more objects of interest in each of the plurality of landmark regions; and autonomously performing, the visual inspection task after attaining the computed set of second target poses on the identified one or more objects of interest in each of the plurality of landmark regions, wherein the visual inspection task is performed as a function of area measurement and maximum distance measurement of the identified one or more objects of interest.

In accordance with an embodiment of the present disclosure, the plurality of template point clouds are obtained for the plurality of templates associated to each of the plurality of landmark regions and the target point cloud is obtained for one or more images of each of the plurality of landmark regions captured by an image capturing device comprised in the UAV.

In accordance with an embodiment of the present disclosure, the plurality of template points clouds and the target point cloud are down-sampled to a predefined size using a VoxelGrid process.

In accordance with an embodiment of the present disclosure, the VoxelGrid process comprises segmenting visible space of the plurality of template point clouds and the target point cloud into a plurality of 3D voxels and approximating each point present inside each of the plurality of 3D voxels with a corresponding centroid.

In accordance with an embodiment of the present disclosure, the visual inspection task is a voice control enabled and a fail-safe navigation enabled.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A and 4B illustrate an exemplary flow diagram illustrating a method for performing an autonomous aircraft visual inspection task, using the system of FIG. 1, in accordance with some embodiments of the present disclosure.

DETAILED DESCRIPTION

Figure 1:
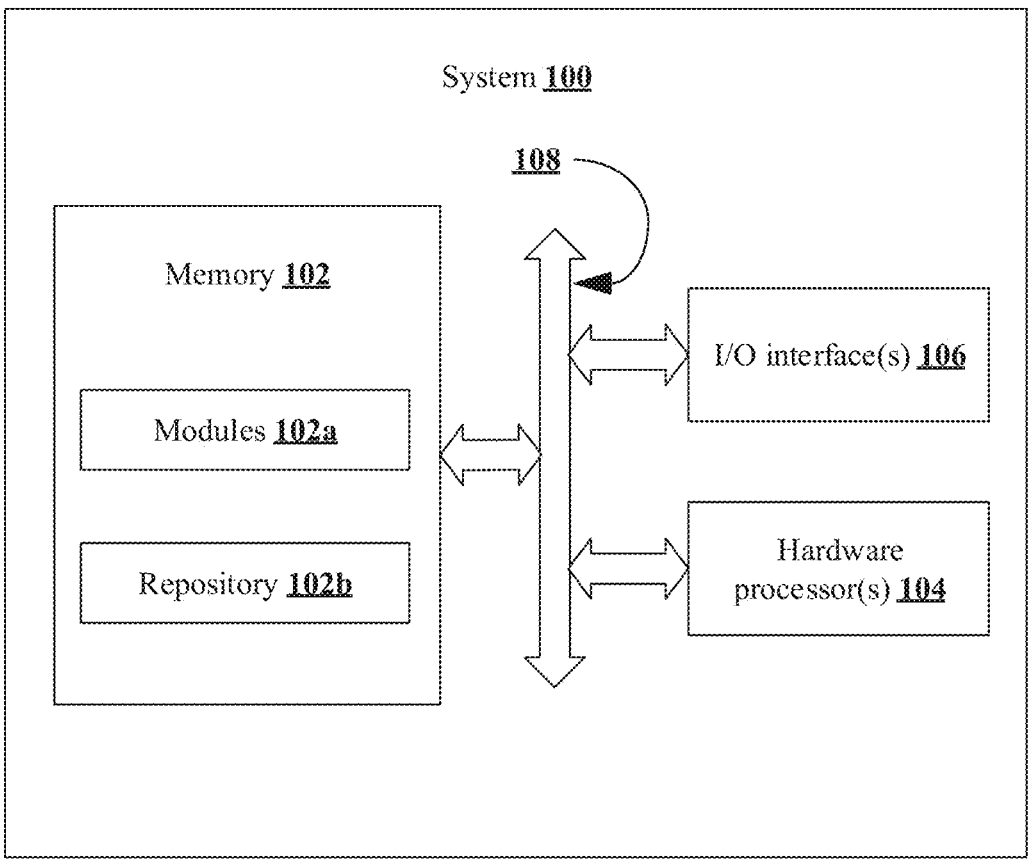
FIG. 1 illustrates an exemplary system for performing an autonomous aircraft visual inspection task, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

In recent years, research on UAVs has rapidly expanded, and UAVs are now being developed for a myriad of purposes, be it search and rescue operations in natural disasters, mine operations, safety monitoring, photography, and many more. One interesting field that has emerged is Flight Inspection using UAV. When it comes to operational safety in civil aviation, flight inspection plays an important role in ensuring proper functioning of navigation and sensing equipment. Flight inspection has several dimensions, such as production inspection in assembly lines for proper subsystem interfaces, joining in MROs for capturing the as-is condition and any specific inspection, periodic inspection, and pre-flight inspection. An external pre-flight assessment is crucial for mitigating aeroplane flight hazards by identifying damaged or defective external sensing and control components. The main objective of using UAV for pre-flight inspection is to reduce the inspection time where a human can take long time to complete the task. A system that can carry out the required tasks at repeatedly and reliably at much lower time and is able to accurately localize itself in relation to the aircraft is needed. This ensures repeatability and makes the whole system more generalized. An autonomous UAV is a best choice, where the navigation should work in any weather, lighting conditions, or GPS denied areas.

Recently, a Coverage Path Planning (CPP) approach was used for UAV base inspection in which an algorithm generates some initial way-points for maximum coverage of the aircraft and then an offline path planning is performed to complete the inspection task. Further, another UAV based inspection exists for exterior screws, where some way-points for the UAV to traverse and take images are also manually defined. These images are then fed to a Convolution Neural Network (CNN) to perform object detection. However, conventional approaches are not capable of doing online path planning where the participating UAV start from any location and execute the inspection task.

The present disclosure addresses unresolved problems of the conventional methods by providing a visual inspection system for aircraft using an autonomous UAV that is auto-adaptable to any aircraft model with minimal manual intervention. The system allows the UAV to start from any random location in the vicinity of the aircraft and register with aircraft body. The UAV autonomously navigate to the corresponding inspection points sequentially. The UAV is equipped with a front-facing low-cost Red green blue-depth (RGB-D) camera, one Velodyne three dimensional Light Detection and Ranging (3D LiDAR) with 64 channels, and one Inertial Measurement Unit (IMU). The UAV navigate using LiDAR and IMU measurements, whereas the inspection process uses measurements from the RGB-D camera. The UAV navigate and perform the inspection task onboard. The system is capable of having manual override and can also be integrated with Voice command and control. This concept can be extended to any autonomous inspection in Maintenance, Repair and Operations (MRO) section or aircraft assembly lines. More Specifically, the present disclosure describes the following:

1. The controlled navigation of the UAV that ensures safe navigation to avoid any collision with the aircraft.
2. Pose generation by the UAV autonomously to view a specific portion of the aircraft surface (for inspecting any object) in best possible way.

3. Method is agnostic to the aircraft or the object for inspection.

Referring now to the drawings, and more particularly to FIGS. 1 through 13B, where similar reference characters denote corresponding features consistently throughout the figures, there are shown preferred embodiments and these embodiments are described in the context of the following exemplary system and/or method.

FIG. 1 illustrates an exemplary system for auto repairing vulnerable code program fragments of a software according to some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions processors and hardware processors may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (shown in FIG. 2) such as a localization module, object detection module, management module, navigation module, inspection module, voice control and command module, and manual override module. Further, the memory 102 may include information pertaining to input (s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
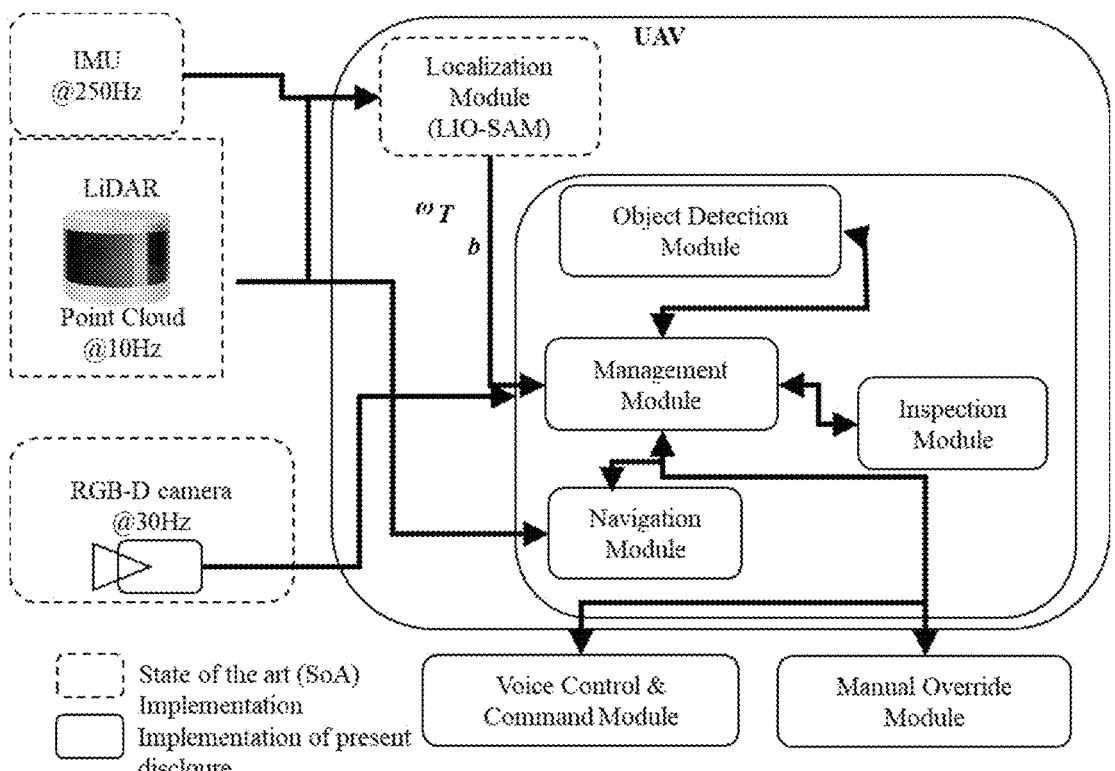
FIG. 2 is a functional block diagram for performing an autonomous aircraft visual inspection task, using the system of FIG. 1, according to some embodiments of the present disclosure.

Embodiments of the present disclosure provide systems and methods for performing an autonomous aircraft visual inspection task. In context of the present disclosure, the expressions 'visual inspection', and 'inspection' may be interchangeably used throughout the description. FIG. 2, with reference to FIG. 1, is a functional block diagram for performing an autonomous aircraft visual inspection task, using the system of FIG. 1, according to some embodiments of the present disclosure.

Figure 3:
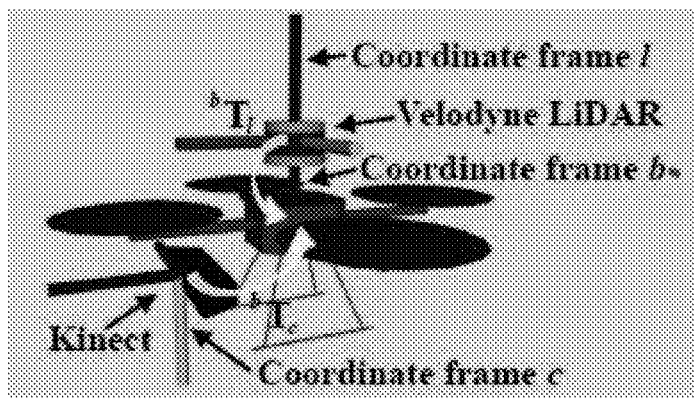
FIG. 3 shows coordinate frames and corresponding transformations on a simulated hector quadrotor for performing an autonomous aircraft visual inspection task, according to some embodiments of the present disclosure.

As shown in FIG. 2, the system of present disclosure comprises multiple modules and the autonomous UAV carries three types of sensors namely an IMU, a Velodyne 3D LiDAR, and a RGB-D camera. FIG. 3 shows coordinate frames and corresponding transformations on a simulated hector quadrotor for performing an autonomous aircraft visual inspection task, according to some embodiments of the present disclosure. Hector quadrotor carries a Kinect RGB-D camera and a Velodyne 3D LIDAR. Three coordinate frames b, l and c are shown in FIG. 3. It is assumed that gravity direction and biases of accelerometer and gyroscope are correctly estimated in a base_link coordinate frame b of the UAV, point clouds captured using the LiDAR are rectified and aligned with the Velodyne coordinate frame l, the point clouds captured using the RGB-D camera are rectified and aligned in the camera coordinate frame c. The sensors are placed in fixed positions on the UAV, and therefore, there exist fixed transformations among all the coordinate frames. It is considered that $^bT_c$ is a fixed transformation from the coordinate frame l to the coordinate frame b, and $^bT_c$ is the fixed transformation from the coordinate frame c to the coordinate frame b.

As shown in FIG. 2, the system of the present disclosure uses a Lidar-Inertial Odometry via Smoothing and Mapping (LIO-SAM) system as the self-localization module, which receives inertial measurement unit (IMU) measurements and point clouds from the LiDAR and estimates poses (i.e., pose of the coordinate frame b) in a fixed world coordinate frame w using a tightly-coupled LiDAR-inertial odometry estimation via smoothing and mapping. For instance, $^wT_b$ could be an estimated pose at any given time instance. In the method of present disclosure, an autonomous visual inspection task is performed where the UAV identifies any specific portion of an aircraft body and performs inspection.

A three-dimensional (3D) model of the aircraft is obtained and divided into multiple landmarks (e.g., nose, left engine, right engine, front landing gear, left wing, right wing, tail, and/or the like) for a UAV to identify. It is assumed that a 3D model of the aircraft is available a priori. In the case where the 3D model of the aircraft is not available, the 3D model of the aircraft is created by flying a UAV manually around the aircraft and creating a map with the LIO-SAM. The UAV is placed near any of the landmarks of the aircraft. The RGB-D camera is facing towards the aircraft, allowing the UAV to takeoff freely. The UAV first identifies the nearest landmark after takeoff and then self-positions in a way to achieve a better view of the landmark. Thereafter, the UAV registers the current fixed coordinate frame, w, with another fixed coordinate frame, a, where landmarks templates are captured. The UAV identifies multiple objects of interest that require inspection and are located around current landmark. Thereafter, the UAV estimates poses, which allows the UAV to get the best possible view of each identified object. The UAV sequentially self-positions with the poses and performs the inspection task with captured point clouds from the RGB-D camera. The management module as shown in FIG. 2 manages synchronization among other modules, and the navigation module takes care of precise restricted navigation.

FIGS. 4A and 4B, with reference to FIGS. 1 and 2, illustrates an exemplary flow diagram illustrating a method for performing an autonomous aircraft visual inspection task, using the system of FIG. 1, in accordance with some embodiments of the present disclosure.

Referring to FIGS. 4A and 4B, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the block diagram of FIG. 2, the diagram of FIG. 3, the flow diagram as depicted in FIGS. 4A and 4B, and one or more examples. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

Figure 5:
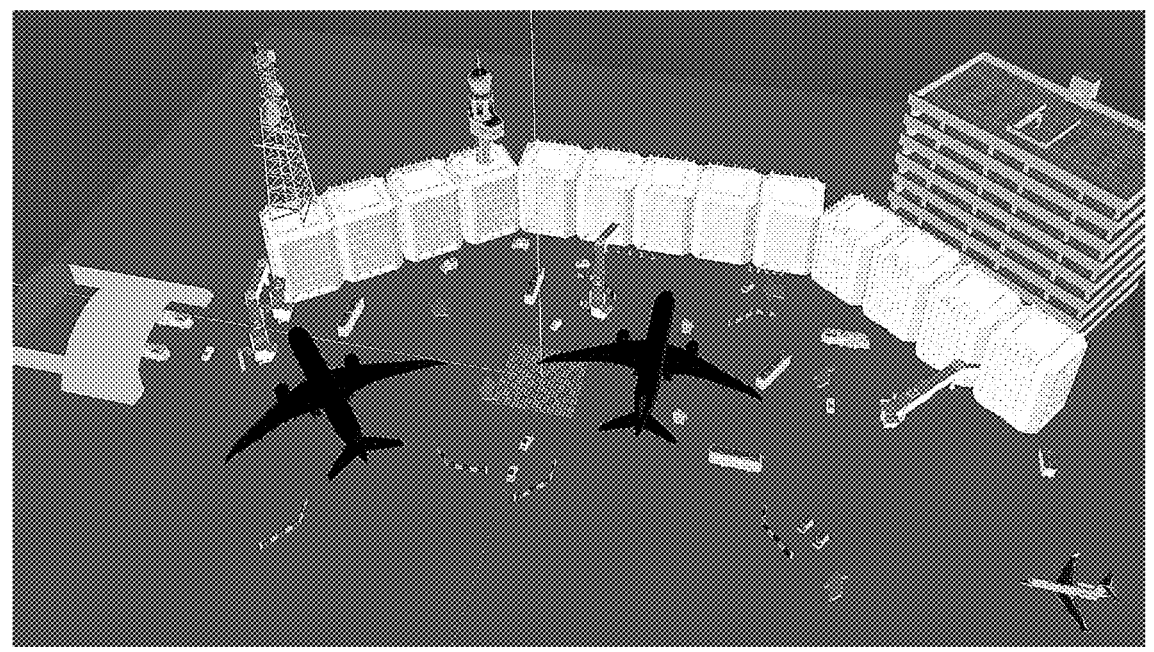
FIG. 5 provides a view of an environment resembling an airport for performing an autonomous aircraft visual inspection task, in accordance with some embodiments of the present disclosure.

Referring to FIG. 4A, at step 202 of the present disclosure, an input/output interface is configured to obtain a template of three-dimensional (3D) representation of geometry of an aircraft in a first coordinate frame for a visual inspection task to be conducted by an unmanned aerial vehicle (UAV). The first coordinate frame is represented by a. The template of three-dimensional (3D) representation of geometry of an aircraft is obtained from a database if already available. In context of the present disclosure, the expressions template of three-dimensional (3D) representation of geometry and 3D model are interchangeably used throughout the description. In the case where the 3D model of the aircraft is not available, the 3D model of the aircraft is created by flying a UAV manually around the aircraft and creating a map with the LIO-SAM. The method of the present disclosure is validated in the Gazebo simulator. FIG. 5 provides a view of an environment resembling an airport for performing an autonomous aircraft visual inspection task, in accordance with some embodiments of the present disclosure. The environment comprises static models of an anonymous aircraft, which is about 52 meters long, with a 55.5 meter wing span, and a maximum height of 14 meters. Additionally, typical objects found in an airport setting, such as boarding bridges and ladders, ground vehicles, boards and markers are also included. These objects provide required geometric features required for LiDAR-Inertial localization around an aircraft when manually using a UAV to construct a 3D representation of the aircraft geometry if one is not available a priori.

Figure 6A:
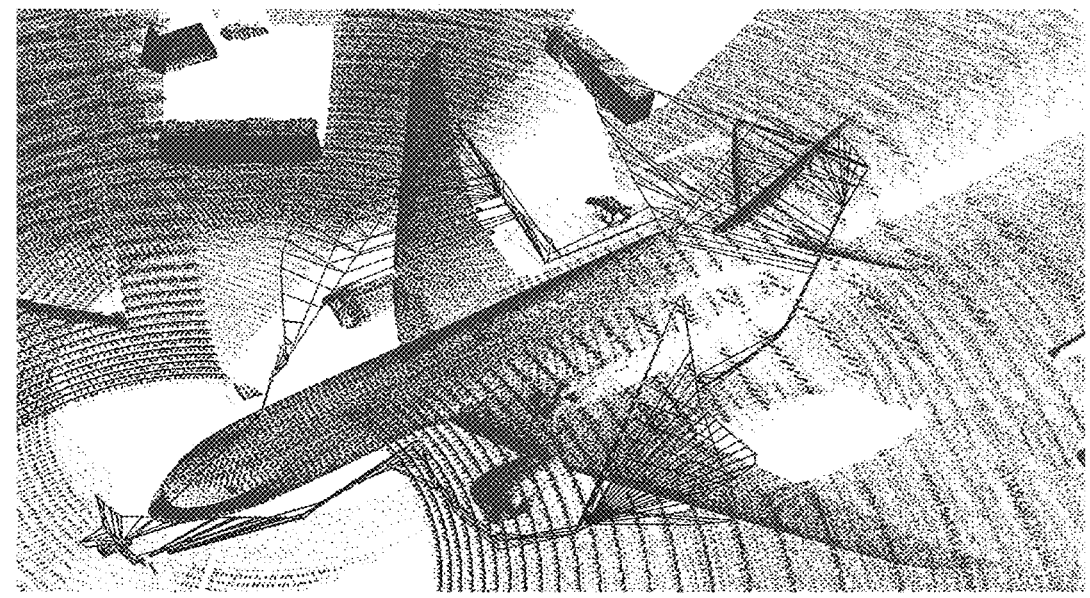
FIGS. 6A and 6B show visualization of environment map output from the LIO-SAM from different viewpoints for performing an autonomous aircraft visual inspection task, in accordance with some embodiments of the present disclosure.
Figure 6B:
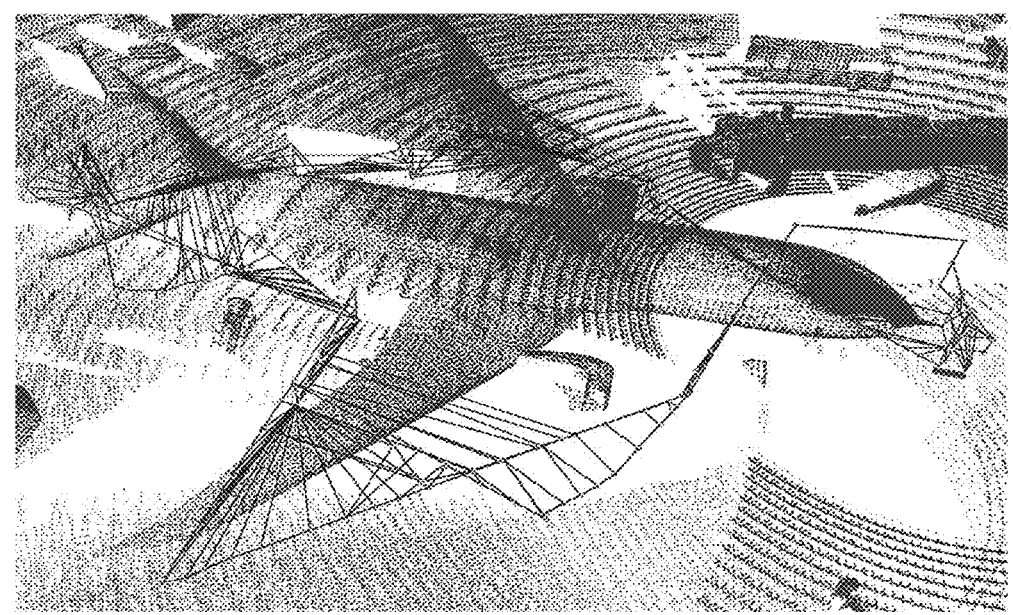
Figure 7:
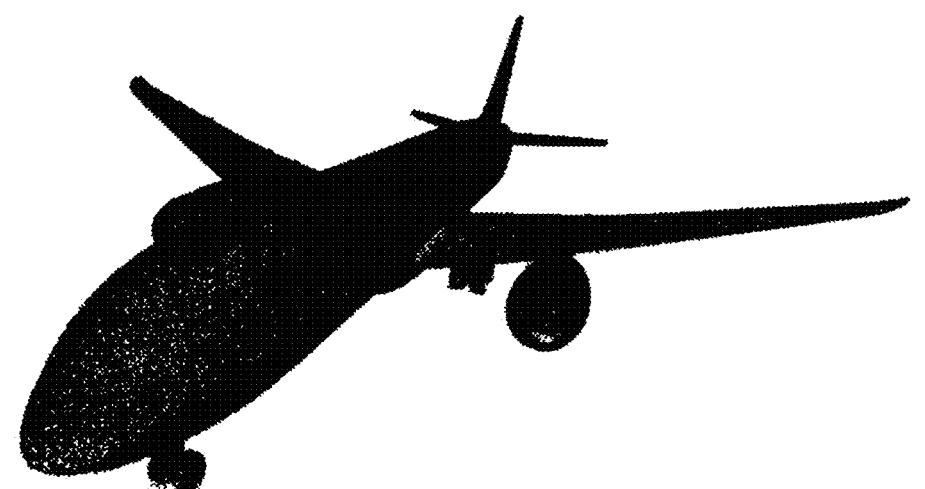
FIG. 7 shows a 3D model of the aircraft extracted from the LIO-SAM map for performing an autonomous aircraft visual inspection task, in accordance with some embodiments of the present disclosure.
Figure 8A:
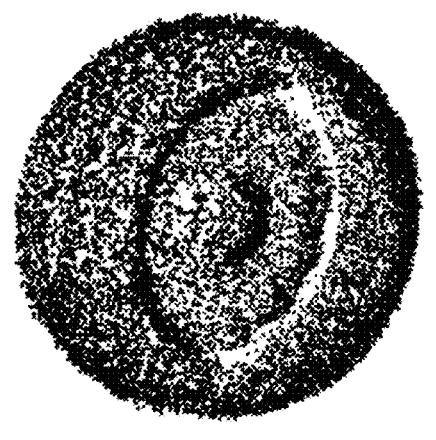
FIGS. 8A and 8B show two sample templates created from a 3D model of an aircraft for two landmarks regions for performing an autonomous aircraft visual inspection task, in accordance with some embodiments of the present disclosure.
Figure 8B:
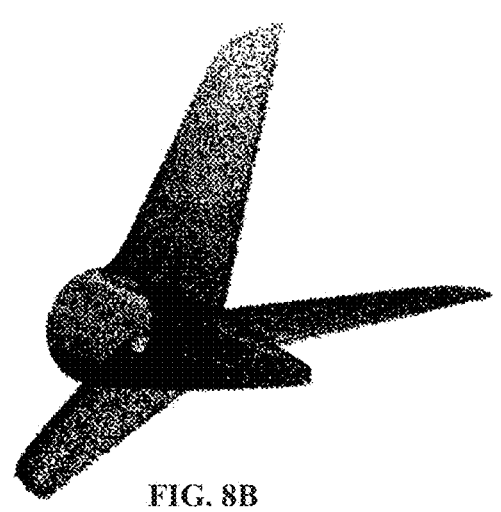

In an embodiment, the process of creating the template of three-dimensional (3D) representation of geometry of the aircraft is offline with a single execution. In this process, one UAV is flown manually around the aircraft and the LIO-SAM is used to generate an accurate and complete map of the environment. The speed of the UAV is restricted within a specific range for best performance by the LIO-SAM. FIGS. 6A and 6B show visualization of environment map output from the LIO-SAM from different viewpoints for performing an autonomous aircraft visual inspection task, in accordance with some embodiments of the present disclosure. The LIO-SAM generates the map of the environment in a fixed world coordinate frame which is the first coordinate frame a. The 3D model of the aircraft is then extracted manually by deleting map points that do not belong to the aircraft body surface. FIG. 7 shows a 3D model of the aircraft extracted from the LIO-SAM map for performing an autonomous aircraft visual inspection task, in accordance with some embodiments of the present disclosure. The 3D model of the aircraft does not contain any of the simulated objects because the point cloud is without any color information. The presence of external geometric features is not essential for inspection process once the 3D model of the aircraft is made available. In the simulation environment, as shown in FIG. 3, the hector quadrotor is used with a kinect sensor mounted as the forward looking RGB-D camera and a Velodyne 3D LiDAR on top.

Further, at step 204 of the present disclosure, the one or more hardware processors 104 are configured to divide the template of the three-dimensional (3D) representation of the geometry of the aircraft into a plurality of landmark regions to obtain a plurality of templates corresponding to each of plurality of landmark regions. The plurality of landmarks for the aircraft could be nose, left engine, right engine, front landing gear, left wing, right wing, tail, and/or the like. The plurality of templates are obtained in the first coordinate frame. The plurality of landmark regions are segmented out to create the plurality of templates for each landmark region. All of the plurality of templates are created in the first coordinate frame a and location of centroid of each template is stored with a fixed transformation $Tl_a$. FIGS. 7A and 7B show two sample templates created from a 3D model of an aircraft for two landmarks regions for performing an autonomous aircraft visual inspection task, in accordance with some embodiments of the present disclosure.

At step 206 of the present disclosure, the one or more hardware processors 104 are configured to register the template of the three-dimensional (3D) representation of the geometry of the aircraft in the first coordinate frame with a target point cloud which is captured in a second coordinate frame using a template matching approach. In the template matching approach, initially a first transformation between a plurality of template point clouds and a target point cloud is computed. The first transformation could be different for each template. The plurality of template point clouds are in the first coordinate frame a and the target point cloud is in the second coordinate frame w. The plurality of template point clouds are obtained for the plurality of templates corresponding to each of the plurality of landmark regions and the target point cloud is obtained for one or more images of each of the plurality of landmark regions captured by an image capturing device comprised in the UAV. The image computing device is the RGB-D camera mounted on the UAV and thus the target point cloud is also referred as RGB-D point cloud. The plurality of template points clouds and the target point cloud are down-sampled to a predefined size using a VoxelGrid process. In the context of the present disclosure, the predefined size is 0.02 meter of voxels. The VoxelGrid process comprises segmenting visible space of the plurality of template points clouds and the target point cloud point cloud into a plurality of 3D voxels and approximating each point present inside each of the plurality of 3D voxels with a corresponding centroid. Further, a matching score between each transformed template point cloud from a plurality of transformed template point clouds and the target point cloud is computed. The matching score is a measure of an average Euclidean distance of a plurality of three-dimensional (3D) points between the plurality of transformed template point clouds and the target point cloud. Furthermore, an optimal transformed template point cloud from the t plurality of transformed template point clouds having an optimal match with the target point cloud is determined based on the computed matching score, The optimal match is determined when the computed matching score between the optimal transformed template point cloud and the target point cloud is less than a predefined threshold. In an embodiment, a second transformation from the first coordinate frame to the second coordinate frame is determined using the optimal transformed template point cloud, wherein a plurality of first target poses of the UAV are determined for each of the plurality of landmark regions in the second coordinate frame w using the determined second transformation. The first target pose is indicative of a pose taken by the UAV for each landmark region of the aircraft such that a best view of the corresponding landmark region is obtained.

The step 206 is better understood by way of the following description provided as exemplary explanation.

The registration process starts with template matching, where a template point cloud is matched with the point cloud that is captured using the RGB-D camera. The RGB-D point cloud is a dense point cloud, but the plurality of template point clouds are not as dense as RGB-D point clouds. However, both the plurality of template point clouds ($PC_t$) and the RGB-D point cloud are down-sampled to a predefined size using the VoxelGrid process. In the VoxelGrid process, the entire visible space is segmented into sets of tiny 3D voxels or cuboids, and all the points present inside of a single voxel are approximated with its centroid. The down-sampling converts the captured RGB-D point cloud with a similar point density as with the plurality of template point clouds ($PC_t$). The down-sampled RGB-D point cloud is denoted as $PC_{RGBD}$ which is in the coordinate frame c. Thereafter all the down-sampled template point clouds are matched with the point cloud $PC_{RGBD}$ and best match is found. The template matching approach is based on Fast Point Feature Histograms (FPFH), where geometry of a point is encoded based on its neighbouring points location and a match between the plurality of template point clouds ($PC_t$) and the target point cloud $PC_{RGBD}$ is found with a Sample Consensus method. The template matching approach computes a rigid transformation ($^cTR$) which can transform each of the plurality of template point cloud ($PC_t$) to align with the point cloud $PC_{RGBD}$. A correct match is considered once the matching score comes below to the predefined threshold $Th_1$. The matching score is the measure of the average Euclidean distance of the 3D points between the point clouds ($PC_t$) and $PC_{RGBD}$. The transformation ($^cTR$) provides a measure of the location of each of the plurality of landmark regions in the coordinate frame c. But the UAV is required to be placed in a way from where each of the plurality of landmark regions would be visible in the best way. A normal position of 3 meters away from a landmark region is considered as the position to achieve the best possible visibility of the landmark region. The UAV can be commanded to the first target pose expressed only in the world coordinate frame w. Therefore, a corresponding first target pose is generated in the coordinate frame w. Equation (1) below shows the relation to generate the first target pose in the coordinate frame w.

$$^wTR = {^wT_b} * {^bT_c} * {^cTR} * {^cTF} \tag{1}$$

Here, $^cTF$ represents the transformation of three meters away from the each of the plurality of landmark regions in the coordinate frame c. The first target pose is provided $^wTR$ to the navigation module to attain an exact pose.

Figure 9:
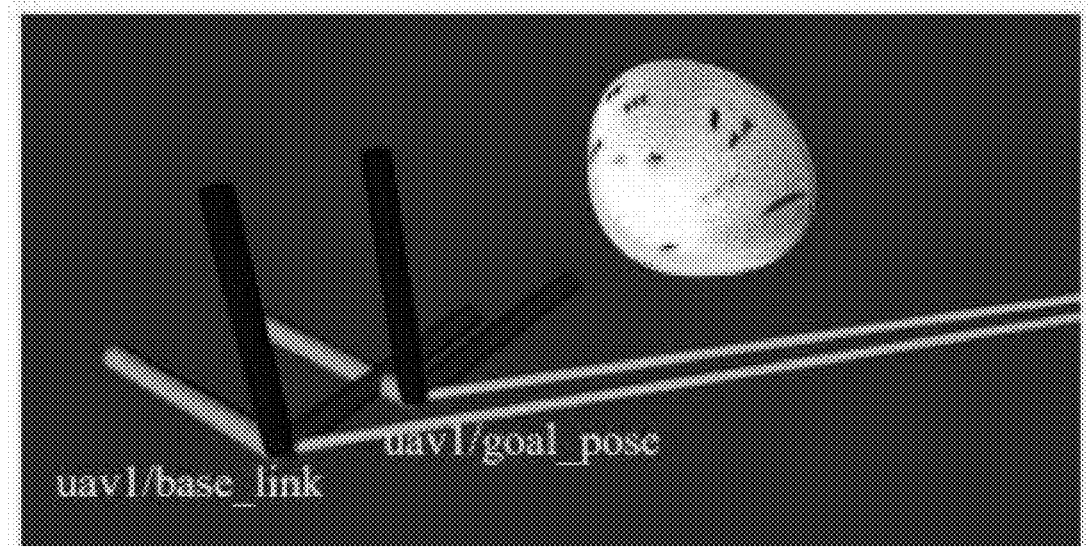
FIG. 9 shows a current pose and a first target pose in the coordinate frame w on a Rviz visualizer for performing an autonomous aircraft visual inspection task, in accordance with some embodiments of the present disclosure.

FIG. 9 shows a current pose and a first target pose in the coordinate frame w on a Rviz visualizer for performing an autonomous aircraft visual inspection task, in accordance with some embodiments of the present disclosure. In context of the present disclosure, the expressions 'first target pose' and 'goal pose' can be interchangeably used throughout the description. In FIG. 9, a Rviz snapshot to show the current pose ('uav1/base link') of the UAV and the first target pose ('uav1/goal_pose') in the coordinate system w to reach a corresponding landmark region (e.g., Nose) is shown. Once the UAV attains the exact pose, the UAV is considered to be aligned with a corresponding landmark region from the plurality of landmark regions.

Referring to FIG. 4B, at step 208 of the present disclosure, the one or more hardware processor are configured to sequentially navigate the UAV from a current location to a desired target location of each of the plurality of landmark regions using the plurality of the first target poses of the UAV determined for each of the plurality of landmark regions. The navigation module makes the UAV to traverse safely from its current location to the desired target location with a given target pose. The navigation module consists of two parts global planning and local planning.

Global planning: The map generated from LIO-SAM is used for global planning. The point cloud data is converted to octomap, which gives information about the planning space. rapidly-exploring random trees Connect (RRTConnect) is used for producing global path. Being a sampling-based algorithm, RRTConnect also requires a collision checker, which checks validity of sampled states. Flexible Collision Checking Library (FCL) is used as the collision checker.

Local Planning: Despite having a global plan which is collision free, it is possible that when the UAV tries to reach the global plan way-points which are closer to ground, some unknown obstacles, such as a ground vehicle may be present. A field of view (FOV) of five meters in radius is defined around the UAV to tackle such unknown obstacles. The UAV continuously checks the validity of the next global way-point inside the FOV. If the way-point is found to be invalid, a fresh valid way-point is generated inside the FOV. Further, a local plan is generated using Probabilistic Road Map (PRM). The PRM keeps a careful check on available free space by sampling uniformly in the FOV, which ensures that a safe local plan is generated if an unknown static obstacle is found.

The UAV navigation is not always very accurate, and the navigation module considers the UAV to have reached the first target pose when the UAV attains a pose which is very close to the target pose and less than a defined threshold at a Euclidean distance $Th_2$ as well as a yaw angle $Th_3$. Therefore, the template matching approach is reiterated between a previously matched template $PC_t$ and a newly captured point cloud $PC_{RGBD}$ in a more restricted way to get a refined transformation matrix $^cTRF$. The refined transformation $^cTRF$ provides location of each of the plurality of landmark regions from the current position of the UAV in the coordinate frame c and the location of each of the plurality of the landmark regions ($^wTRF$) is calculated in the coordinate frame w using equation (2) provided below:

$$^wTRF = {}^wT_b * {}^bT_c * {}^cTRF \qquad (2)$$

Now the plurality of templates are in the coordinate frame a and the plurality of templates are aligned with the each of the plurality of landmark regions with a transformation $^wTRF$ in the coordinate frame w. Therefore, a transformation between the coordinate frames w and a is estimated which remains fixed as both the coordinate frames are fixed. The fixed transformation $^wT_a$ from the coordinate frame w to the coordinate frame a is formulated as provided in equation (3) below:

$$^wT_a = {}^wTRF * Tl_a \qquad (3)$$

Here, $Tl_a$ is the transformation of origin of the point cloud $PC_t$ in the coordinate frame a. The fixed transformation $^wT_a$ allows the UAV to register with the coordinate frame a. Once a UAV registers with the coordinate frame, the UAV gets the locations of all other landmark regions in the coordinate frames a and its own world coordinate frame w. The UAV starts the inspection task with object identification.

Referring back to FIG. 4B, at step 210 of the present disclosure, the one or more hardware processor are configured to identify one or more objects of interest in each of the plurality of landmark regions using a deep learning based object detection approach during sequential navigation. The one or more objects of interest are identified based on one or more characteristics. In the context of the present disclosure, the expressions 'object of interest' and 'object' can be interchangeably used throughout the description. The visual inspection task is intended to inspect multiple sensors that are present on the outer surface of the aircraft for periodic maintenance or pre-flight maintenance. The simulated 3D model of the aircraft does not contain geometry of any of these sensors. Therefore, such sensors are mimicked using some specific geometrically shaped colored patches on the aircraft surfaces using an open-source blender software.

Figure 10A:
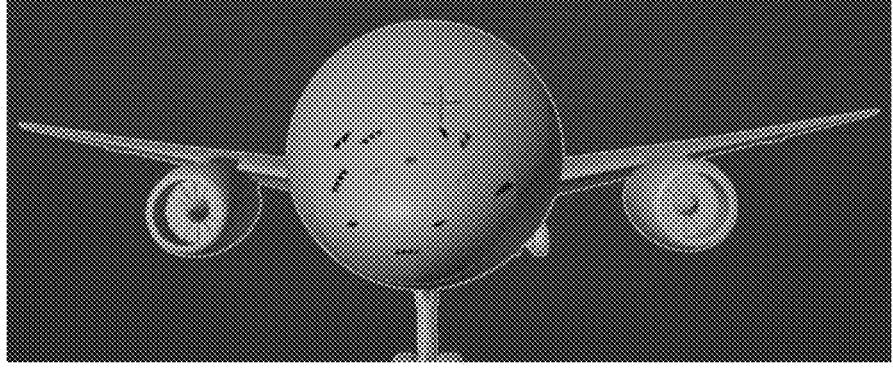
FIGS. 10A and 10 B show multiple geometrical shaped colored patches on the aircraft outer surface for performing an autonomous aircraft visual inspection task, in accordance with some embodiments of the present disclosure.
Figure 10B:
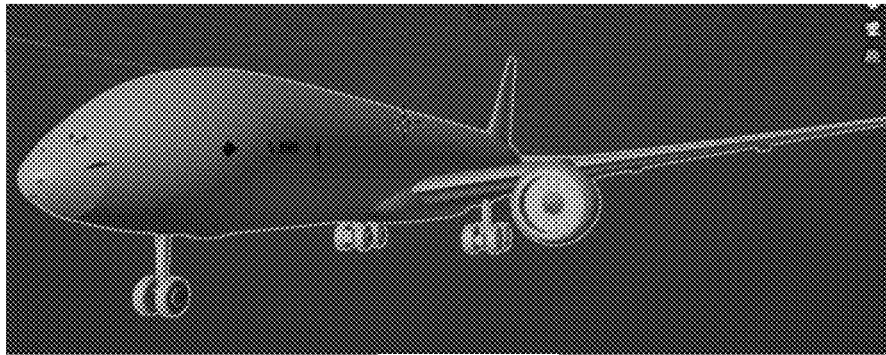

FIGS. 10A and 10B show multiple geometrical shaped colored patches on the aircraft outer surface for performing an autonomous aircraft visual inspection task, in accordance with some embodiments of the present disclosure.

The visual inspection task is based on inspecting different sensors or objects, such as Angle of Attack sensor, Total Air Temperature (TAT) sensor, Air Traffic Control (ATC) antenna, Traffic alert and Collision Avoidance, Airborne Collision Avoidance, ice detector, Air temperature sensor, an/or like which can be visually checked from the outside, and each object has different inspection parameters. The inspection can only start after identifying a specific object. These types of objects, which have distinct geometrical shapes and create undulations on the surface of the aircraft, are missing in the simulated model of the aircraft. Therefore, these objects are simulated as small colorful geometrical shaped patches on the surface of the aircraft. These objects are referred as the one or more objects of interest. First, an object detection module is used to identify the one or more objects of interest from the captured RGB images that are present around a landmark region. The object detection is based on a learning-based detection method, and a well-established deep learning-based object classification tool You Only Look Once, Version 3 (YOLO v3) is used for this purpose. YOLO v3 is chosen for its acceptable accuracy for such simplistic objects of interest and very fast execution time to support real-time systems.

In the present disclosure, three patches around the 'Nose' landmark are used as the one or more objects of interest out of all the patches put on the aircraft surface, and a very small set of training data (i.e., 567 images with three classes) to train a deep learning model quickly and establish a capability of the object detection method.

Figure 11:
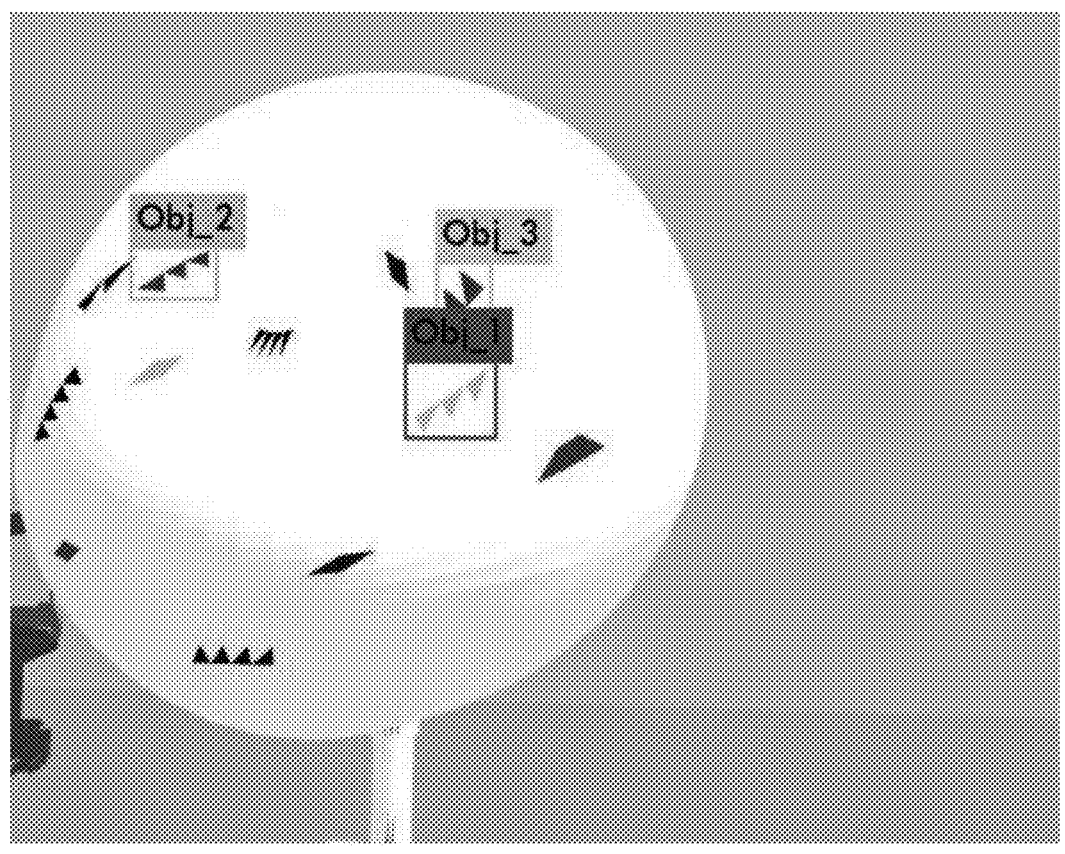
FIG. 11 shows a sample output of the object detection module for performing an autonomous aircraft visual inspection task, in accordance with some embodiments of the present disclosure. Here, the detected three classes are annotated with bounding boxes and object ids.

FIG. 11 shows a sample output of the object detection module for performing an autonomous aircraft visual inspection task, in accordance with some embodiments of the present disclosure. Here, the detected three classes are annotated with bounding boxes and object ids. As shown in FIG. 11, the object detection module produces the coordinates of the bounding boxes of the identified objects of interest on the RGB image plane. For example, a 2D pixel with coordinates $(p_x, p_y)$ on the image plane is assumed, then a corresponding 3D coordinates of the 2D pixel in the coordinate frame c is calculate by 2D-3D relations as shown in equation (4) provided below:

$$P_x = D \tag{4}$$

$$P_y = (p_x - c_x) * P_z / f_x$$

$$P_z = (p_y - c_y) * P_z / f_y$$

Here ($P_x$, $P_y$, $P_z$) is the 3D point, ($c_x$, $c_y$) is principle point of the camera and $f_x$ and $f_y$ are focal lengths in horizontal and vertical directions, respectively. Thus, corresponding 3D bounding rectangles for each of the 2D bounding boxes can be obtained. Afterwards, all the RGB-D points that fall within the 3D bounding rectangles are extracted and the centroids are calculated.

Figure 12A:
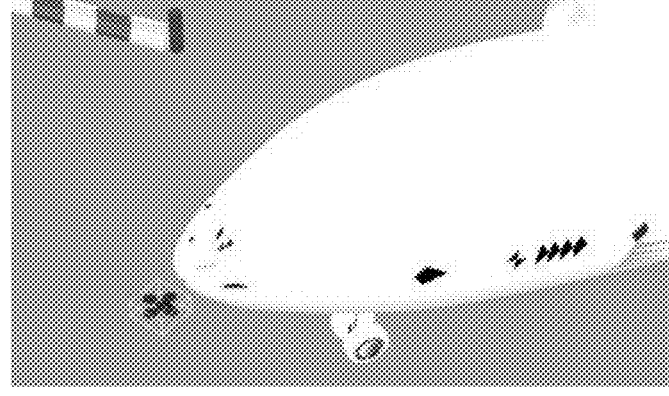
FIGS. 12 A and 12 B show snapshots of Gazebo and the corresponding Rviz visualizer where a UAV is positioned to get the best view of first object of interest respectively for performing an autonomous aircraft visual inspection task, in accordance with some embodiments of the present disclosure.

At step 212 of the present disclosure, the one or more hardware processor are configured to compute a set of second target poses in the second coordinate frame w for the identified one or more objects of interest in each of the plurality of landmark regions. The set of second target poses are calculated for each centroid of the 3D bounding rectangles, where the set of second target poses are at the same height as the centroid and looking towards the corresponding centroids from a user-defined distance. These set of second target poses are considered the best view poses to capture the data for the corresponding objects of interest for inspection. The set of second target poses are first calculated in the coordinate frame c and subsequently converted to the coordinate frame w using the similar transformation as shown in equation (1). FIGS. 12 A and 12 B show snapshots of Gazebo and the corresponding Rviz visualizer respectively where a UAV is positioned to get the best view of first object of interest for performing an autonomous aircraft visual inspection task, in accordance with some embodiments of the present disclosure. FIG. 12A shows a snapshot of Gazebo that shows the UAV is positioned at the best view pose for Obj 1.

Figure 12B:
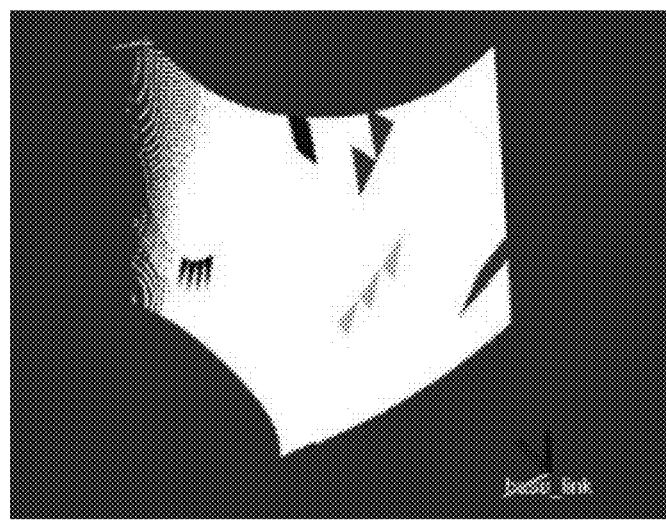

FIG. 12B shows the Rviz visualization corresponding to the snapshot of Gazebo that shows the base link frame looking towards the first object of interest Obj 1 (i.e., three consecutive triangles) and the captured RGB-D point cloud, where the Obj 1 is visible. The navigation module uses the set of second target poses sequentially to position the UAV for inspection.

Referring back to FIG. 4B, at step 214 of the present disclosure, the one or more hardware processor are configured to autonomously perform the visual inspection task after attaining the computed set of second target poses on the identified one or more objects of interest in each of the plurality of landmark regions. The visual inspection task is performed as a function of area measurement and maximum distance measurement of the identified one or more objects of interest.

The step 214 is further better understood by way of the following description provided as exemplary explanation.

Once the UAV is positioned to a second target pose from the set of second target poses to get the best possible view of an object of interest from the identified one or more objects of interest, the inspections module starts. The inspection of the simulated objects are carried out in the form of area measurement and maximum distance measurement in the system of present disclosure. Simulated object measurement is quite different from real objects on the aircraft surface. Therefore, a domain-specific learning-based inspection is required in real scenarios, but the measurement of simulated objects is presented to show capability of the system. The inspection module uses RGB-D point clouds captured after reaching to the best view based on the second target pose, where the object is completely visible in the best possible way. Firstly, a color-based region-growing algorithm is used to segment the points that form the colored objects. Afterwards, these segmented points are used to measure the area and maximum distance on a metric scale. The area of an object is measured by measuring the areas of the individual triangles, where the area of a triangle is measured using the lengths of the three sides. The maximum distance is calculated by calculating the Euclidean distance between the two furthest corner points.

Figure 13A:
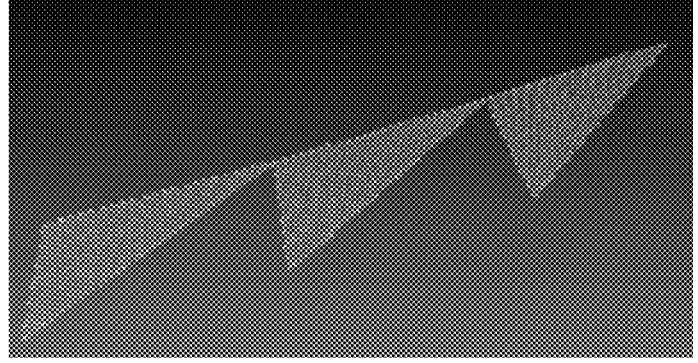
FIGS. 13A and 13 B depict measured area and the maximum distance for an identified object of interest respectively for performing an autonomous aircraft visual inspection task, in accordance with some embodiments of the present disclosure.
Figure 13B:
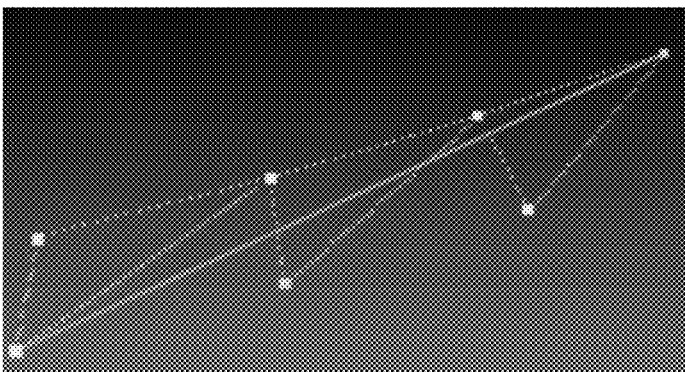

FIGS. 13 A and 13 B depict measured area and the maximum distance for an identified object of interest respectively for performing an autonomous aircraft visual inspection task, in accordance with some embodiments of the present disclosure. FIG. 13A shows the segmented point cloud for Obj 1, which represents the area of Obj 1. FIG. 13B shows the calculated maximum distance using two furthest ending corner points. Inspecting in a real scenario, the UAV is able to localize any specific anomaly on the aircraft surface in the coordinate frame a and also from the nearest landmark region which helps the service person to identify any anomaly quickly.

In an embodiment, the visual inspection task is voice control enabled and fail-safe navigation enabled. There is an option to control the system of the present disclosure using voice control commands which is required when the UAV must go immediately to some specific location to inspect any specific portion. Also, there is a fail-safe navigation option in the system of the present disclosure by taking manual control of the UAV in any abnormal situation.

Experimental Results

The system of the present disclosure is evaluated only in a simulated airport like environment. The system of the present disclosure is ROS compatible and implemented with C++ and python-based ROS nodes. The entire system runs on a standard workstation, having Intel Core i7-9700k with 8 cores @3.60 GHz, 32 GB of RAM and 8 GB of Nvidia RTX2070 Graphics. In the present disclosure, accuracy measurements for registration and object measurement processes with the simulated data are presented. Table 1 below shows the values of the parameters that are set in the implementation of the system of the present disclosure for all of the experiments conducted.

TABLE 1

| $f_x$ | $f_y$ | $c_x$ | $c_y$ | $Th_1$ (meter) | $Th_2$ (meter) | $Th_3$ |
|---|---|---|---|---|---|---|
| 554.255 | 554.255 | 320.5 | 220.5 | 0.004 | 0.03 | $1^0$ |

Measurement Validation: The present disclosure evaluates measurement accuracy after calculating the object area and the maximum distance. A repeated execution is performed to measure the area and maximum distances for all three objects and validated them against the ground truth. The average percentage errors of area measurement are 1.73%, 2.72% and 3.42%, respectively for all three objects. The average percentage errors of maximum distances are 0.46%, 0.47% and 0.83%, respectively for all three objects.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

Embodiments of the present disclosure provide a visual inspection system for aircraft using an autonomous UAV that is auto-adaptable to any aircraft model with minimal manual intervention. The system allows the UAV to start from any random location in the vicinity of the aircraft and navigate using LiDAR-Inertial measurements. The system uses a low-cost RGB-D camera for inspection and detects defects. The system is capable of having manual override and can also be integrated with "Voice command and control". This concept can be extended to any autonomous inspection in MRO section or aircraft assembly lines and/or the like. In the method of the present disclosure, the UAV takeoff from any nearby location of the aircraft and face the RGB-D camera towards the aircraft. The UAV find the nearest landmark using a template matching approach and register with the aircraft coordinate system. The UAV navigate using a proposed safe navigation around the aircraft by avoiding obstacles. The system identifies the objects of interest using a deep-learning based object detection tool and then performs the inspection. A simple measuring algorithm for simulated objects of interest is implemented in the present disclosure where millimeter range accuracy is achieved.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:

obtaining, via an I/O interface, a template of three-dimensional (3D) representation of a geometry of an aircraft in a first coordinate frame for a visual inspection task to be conducted by an unmanned aerial vehicle (UAV);

dividing, via the one or more hardware processors, the template of the three-dimensional (3D) representation of the geometry of the aircraft into a plurality of landmark regions to obtain a plurality of templates corresponding to each of the plurality of landmark regions, wherein the plurality of templates is obtained in the first coordinate frame;

registering, via the one or more hardware processors, the template of the three-dimensional (3D) representation of the geometry of the aircraft in the first coordinate frame with a target point cloud captured by the UAV in a second coordinate frame using a template matching approach, wherein the template matching approach comprises:

computing a first transformation between a plurality of template point clouds and the target point cloud;

computing, a matching score between each transformed template point cloud from a plurality of transformed template point clouds and the target point cloud, wherein the matching score is a measure of an average Euclidean distance of a plurality of three-dimensional (3D) points between the plurality of transformed template point clouds and the target point cloud;

determining an optimal transformed template point cloud from the plurality of transformed template point clouds having an optimal match with the target point cloud based on the computed matching score, wherein the optimal match is determined when the computed matching score between the transformed template point cloud and the target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation;

sequentially navigating, via the one or more hardware processors, the UAV from a current location to a desired target location of each of the plurality of landmark regions using the plurality of the first target poses of the UAV determined for each of the plurality of landmark regions;

identifying, via the one or more hardware processors, one or more objects of interest in each of the plurality of landmark regions using a deep learning-based object detection approach during sequential navigation, wherein the one or more objects of interest are identified based on one or more characteristics;

obtaining, via the one or more hardware processors, coordinates of bounding boxes of the identified objects of interest on the RGB image plane and corresponding 3D bounding rectangles for each of the bounding boxes using 2D-3D relations;

calculating, via the one or more hardware processors, a centroid, by extracting RGB-D points that fall within the 3D bounding rectangles;

computing, via the one or more hardware processors, a set of second target poses in the second coordinate frame for the identified one or more objects of interest in each of the plurality of landmark regions, wherein the set of second target poses are calculated for each centroid of the 3D bounding rectangles, wherein the set of second target poses are at the same height as the centroid and looking towards corresponding centroids from a user-defined distance and wherein the set of second target poses are view poses to capture data for the corresponding objects of interest for inspection; and autonomously performing, via the one or more hardware processors, the visual inspection task after attaining the computed set of second target poses on the identified one or more objects of interest in each of the plurality of landmark regions, wherein the visual inspection task is performed as a function of area measurement and maximum distance measurement of the identified one or more objects of interest, wherein the RGB-D points captured after reaching to the view based on the second target pose is used by the visual inspection task to get the possible view of the object of interest from the identified one or more objects of interest.

2. The processor implemented method of claim 1, wherein the plurality of template point clouds are obtained for the plurality of templates associated to each of the plurality of landmark regions and the target point cloud is obtained for one or more images of each of the plurality of landmark regions captured by an image capturing device comprised in the UAV.

3. The processor implemented method of claim 2, wherein the plurality of template point clouds and the target point cloud are down-sampled to a predefined size using a Voxel-Grid process.

4. The processor implemented method of claim 3, wherein the VoxelGrid process comprises segmenting visible space of the plurality of template points clouds and the target point cloud into a plurality of 3D voxels and approximating each point present inside each of the plurality of 3D voxels with a corresponding centroid.

5. The processor implemented method of claim 1, wherein the visual inspection task is a voice control enabled, and a fail-safe navigation enabled.

6. The system of claim 1, wherein the visual inspection task is a voice control enabled and a fail-safe navigation enabled.

7. A system, comprising:

a memory storing instructions;

one or more communication interfaces; and one or more hardware processors coupled to the memory via the one or more communication interfaces, wherein the one or more hardware processors are configured by the instructions to:

obtain a template of three-dimensional (3D) representation of a geometry of an aircraft in a first coordinate frame for a visual inspection task to be conducted by an unmanned aerial vehicle (UAV);

divide the template of the three-dimensional (3D) representation of the geometry of the aircraft into a plurality of landmark regions to obtain a plurality of templates corresponding to each of the plurality of landmark regions, wherein the plurality of templates are obtained in the first coordinate frame;

register the template of the three-dimensional (3D) representation of the geometry of the aircraft in the first coordinate frame with a target point cloud in a second coordinate frame using a template matching approach, wherein the template matching approach comprises:

computing a first transformation between a plurality of template point clouds and the target point cloud;

computing, a matching score between each transformed template point cloud from a plurality of transformed template point clouds and the target point cloud, wherein the matching score is a measure of an average Euclidean distance of a plurality of three-dimensional (3D) points between the plurality of transformed template point clouds and the target point cloud;

determining an optimal transformed template point cloud from the transformed plurality of template point clouds having an optimal match with the target point cloud based on the computed matching score, wherein the optimal match is determined when the computed matching score between the transformed template point cloud and the t target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation;

sequentially navigate the UAV from a current location to a desired target location of each of the plurality of landmark regions using the plurality of the first target poses of the UAV determined for each of the plurality of landmark regions;

identify one or more objects of interest in each of the plurality of landmark regions using a deep learning-based object detection approach during sequential navigation, wherein the one or more objects of interest are identified based on one or more characteristics;

obtain coordinates of bounding boxes of the identified objects of interest on the RGB image plane and corresponding 3D bounding rectangles for each of the bounding boxes using 2D-3D relations;

calculate a centroid, by extracting RGB-D points that fall within the 3D bounding rectangles;

compute a set of second target poses in the second coordinate frame for the identified one or more objects of interest in each of the plurality of landmark regions, wherein the set of second target poses are calculated for each centroid of the 3D bounding rectangles, wherein the set of second target poses are at the same height as the centroid and looking towards corresponding centroids from a user-defined distance and wherein the set of second target poses are view poses to capture data for the corresponding objects of interest for inspection; and autonomously perform the visual inspection task after attaining the computed set of second target poses on the identified one or more objects of interest in each of the plurality of landmark regions, wherein the visual inspection task is performed as a function of area measurement and maximum distance measurement of the identified one or more objects of interest, wherein the RGB-D points captured after reaching to the view based on the second target pose is used by the visual inspection task to get the possible view of the object of interest from the identified one or more objects of interest.

8. The system of claim 7, wherein the plurality of template point clouds are obtained for the plurality of templates associated to each of the plurality of landmark regions and the target point cloud is obtained for one or more images of each of the plurality of landmark regions captured by an image capturing device comprised in the UAV.

9. The system of claim 7, wherein the plurality of template point clouds and the target point cloud are down-sampled to a predefined size using a VoxelGrid process.

10. The system of claim 9, wherein the VoxelGrid process comprises segmenting visible space of the plurality of template points clouds and the target point cloud into a plurality of 3D voxels and approximating each point present inside each of the plurality of 3D voxels with a corresponding centroid.

11. One or more non-transitory computer readable mediums comprising one or more instructions which when executed by one or more hardware processors cause:

obtaining a template of three-dimensional (3D) representation of a geometry of an aircraft in a first coordinate frame for a visual inspection task to be conducted by an unmanned aerial vehicle (UAV);

dividing the template of the three-dimensional (3D) representation of the geometry of the aircraft into a plurality of landmark regions to obtain a plurality of templates corresponding to each of the plurality of landmark regions, wherein the plurality of templates are obtained in the first coordinate frame;

registering the template of the three-dimensional (3D) representation of the geometry of the aircraft in the first coordinate frame with a target point cloud captured by the UAV in a second coordinate frame using a template matching approach, wherein the template matching approach comprises:

computing a first transformation between a plurality of template point clouds and the target point cloud;

computing, a matching score between each transformed template point cloud from a plurality of transformed template point clouds and the target point cloud, wherein the matching score is a measure of an average Euclidean distance of a plurality of three-dimensional (3D) points between the plurality of transformed template point clouds and the target point cloud;

determining an optimal transformed template point cloud from the plurality of transformed template point clouds having an optimal match with the target point cloud based on the computed matching score, wherein the optimal match is determined when the computed matching score between the transformed template point cloud and the target point cloud is less than a predefined threshold; and determining a second transformation from the first coordinate frame to the second coordinate frame using the optimal transformed template point cloud, wherein a plurality of first target poses of the UAV are determined for each of the plurality of landmark regions in the second coordinate frame using the determined second transformation;

sequentially navigating the UAV from a current location to a desired target location of each of the plurality of landmark regions using the plurality of the first target poses of the UAV determined for each of the plurality of landmark regions;

identifying one or more objects of interest in each of the plurality of landmark regions using a deep learning-based object detection approach during sequential navigation, wherein the one or more objects of interest are identified based on one or more characteristics;

obtaining, coordinates of bounding boxes of the identified objects of interest on the RGB image plane and corresponding 3D bounding rectangles for each of the bounding boxes using 2D-3D relations;

calculating, a centroid, by extracting RGB-D points that fall within the 3D bounding rectangles;

computing a set of second target poses in the second coordinate frame for the identified one or more objects of interest in each of the plurality of landmark regions, wherein the set of second target poses are calculated for each centroid of the 3D bounding rectangles, wherein the set of second target poses are at the same height as the centroid and looking towards corresponding centroids from a user-defined distance and wherein the set of second target poses are view poses to capture data for the corresponding objects of interest for inspection; and autonomously performing the visual inspection task after attaining the computed set of second target poses on the identified one or more objects of interest in each of the plurality of landmark regions, wherein the visual inspection task is performed as a function of area measurement and maximum distance measurement of the identified one or more objects of interest, wherein the RGB-D points captured after reaching to the view based on the second target pose is used by the visual inspection task to get the possible view of the object of interest from the identified one or more objects of interest.

12. The non-transitory computer readable mediums as claimed in claim 11, wherein the plurality of template point clouds are obtained for the plurality of templates associated to each of the plurality of landmark regions and the target point cloud is obtained for one or more images of each of the plurality of landmark regions captured by an image capturing device comprised in the UAV.

13. The non-transitory computer readable mediums as claimed in claim 12, wherein the plurality of template point clouds and the target point cloud are down-sampled to a predefined size using a VoxelGrid process.

14. The non-transitory computer readable mediums as claimed in claim 13, wherein the VoxelGrid process comprises segmenting visible space of the plurality of template points clouds and the target point cloud into a plurality of 3D voxels and approximating each point present inside each of the plurality of 3D voxels with a corresponding centroid.

15. The non-transitory computer readable mediums as claimed in claim 11, wherein the visual inspection task is a voice control enabled and a fail-safe navigation enabled.

* * * * *